(12) United States Patent
Kolesnikov (10) Patent No.: US 11,927,495 B2
(45) Date of Patent: Mar. 12, 2024

(54) SYSTEM AND METHOD FOR CONTACTLESS DETERMINATION OF MECHANICAL STRESSES IN PIPELINE

(71) Applicant: Igor Sergeevich Kolesnikov, Moscow (RU)

(72) Inventor: Igor Sergeevich Kolesnikov, Moscow (RU)

( * ) Notice: Subject to any disclaimer, the term of this patent is extended or adjusted under 35 U.S.C. 154(b) by 340 days.

(21) Appl. No.: 17/611,662

(22) PCT Filed: Feb. 12, 2021

(86) PCT No.: PCT/RU2021/000062
§ 371 (c)(1),
(2) Date: Nov. 16, 2021

(87) PCT Pub. No.: WO2022/086362
PCT Pub. Date: Apr. 28, 2022

(65) Prior Publication Data
US 2022/0307923 A1   Sep. 29, 2022

(30) Foreign Application Priority Data
Oct. 20, 2020   (RU) .............................. 2020134428

(51) Int. Cl.
*G01L 1/12*   (2006.01)
(52) U.S. Cl.
CPC .................................... *G01L 1/127* (2013.01)

(58) Field of Classification Search
CPC . G01L 1/127; G01L 1/12; G01M 3/16; G01N 27/83
USPC ...................................................... 73/862.69
See application file for complete search history.

(56) References Cited

U.S. PATENT DOCUMENTS

| 9,513,258 B2 * | 12/2016 | Freear ................... G01N 27/72 |
| 10,364,665 B2 | 7/2019 | Girrell et al. |
| 2014/0298916 A1 * | 10/2014 | Duan ...................... G01L 1/125 73/779 |
| 2016/0231278 A1 * | 8/2016 | Goroshevskiy ........ G01N 27/85 |

FOREIGN PATENT DOCUMENTS

| RU | 2079825 C1 | 5/1997 |
| RU | 2195636 C2 | 12/2002 |

* cited by examiner

*Primary Examiner* — Marrit Eyassu
(74) *Attorney, Agent, or Firm* — Nadya Reingand (57) ABSTRACT

The invention relates to the field of measurement technology using computational technology and can be used in the industrial field that deals with pipelines (e.g., in the oil and gas industry, the construction industry, the energy industry, the nuclear industry, the utilities industry, the diagnostics of metallic structures, and the environmental protection industry). The technical result is an increase in the accuracy of determining mechanical stresses, while simultaneously providing the proper accuracy of detecting an anomaly source in a pipeline.

17 Claims, 2 Drawing Sheets

SYSTEM AND METHOD FOR CONTACTLESS DETERMINATION OF MECHANICAL STRESSES IN PIPELINE

TECHNICAL FIELD OF THE INVENTION

The invention relates to the field of measurement technology using computational technology and can be used in the industrial field that deals with pipelines (e.g., in the oil and gas industry, the construction industry, the energy industry, the nuclear industry, the utilities industry, the diagnostics of metallic structures, and the environmental protection industry).

BACKGROUND OF THE INVENTION

The stress state of walls of thin-walled pipes in pipelines is mainly determined by two main stresses: hoop and longitudinal. The hoop stresses in the pipe wall are caused by the internal pressure of a transported fluid, and they are constant around the circumference of a given pipe cross-section in the absence of possible inhomogeneities and defects. If a defect or inhomogeneity is present, the uneven distribution of the hoop stresses in the region of this inhomogeneity will be observed, and this anisotropy will be caused by a local stress concentration. The longitudinal stresses are composed of stresses caused by: 1. the internal pressure of the fluid (calculated as a share of the hoop stresses); 2. possible thermal stresses; 3. a pipe bend that can be caused by the curvature of a pipeline route during pipeline laying (e.g., the curvature of a pipeline trench), or possible non-design external influences and/or changes in a pipeline position (e.g., as a result of pipeline floating-up, pipeline movements due to landslide processes, etc.). Therefore, the practical priority task of determining the stress state of pipelines consists in assessing bending stresses in potentially dangerous pipeline cross-sections.

There are now many solutions for detecting mechanical stresses in pipelines. US 2016/0231278 A1 discloses a system and method for inspecting a subsea vertical pipeline. This solution provides a device for discovering, identifying, and monitoring mechanical flaws in metallic structures based on magneto-graphic/magnetic tomography technique to identify stress-related defects. The device can determine the position of the defect or stress, including depth information. The device includes registration means that are optimized for use with the metallic structures of various types, shapes and sizes. The solution involves real-time quality control, monitoring and emergency alarms, as well structural repairs and maintenance work recommendations and scheduling.

However, the known solution has drawbacks. Among these drawbacks, there is a low accuracy of determining the mechanical stresses in the pipeline. This drawback is caused by that the known solution provides the possibility of controlling only one type of stresses at the appropriate orientation of the device. In other words, the known solution does not make it possible to measure magnetic flux densities simultaneously through four planes in space and, subsequently, to determine the mechanical stresses in the pipeline based on the calculated distribution of mechanical stresses at each measure point throughout the pipeline.

SUMMARY OF THE INVENTION

The object of the invention is to eliminate the above-indicated drawbacks and provide a solution that allows determining the actual state of a pipeline operating under real loads.

The technical result is an increase in the accuracy of determining mechanical stresses, while simultaneously providing the proper accuracy of detecting an anomaly source in the pipeline.

The technical result is achieved by a proposed system for contactless determination of mechanical stresses in a pipeline. The system comprises: a device for contactless measurement of the mechanical stresses in the pipeline, the device comprising at least three devices for contactless measurement of a magnetic flux density and being configured to move along an axis of the pipeline at a distance from the pipeline and subsequently transmit data on the mechanical stresses in the pipeline to a computing device, the data comprising information on a shape of a distribution of mechanical stresses; wherein each of the above-mentioned devices for contactless measurement of the magnetic flux density includes an array of sensors configured to measure the magnetic flux density by performing a sequential contactless measurement of characteristic parameters along the axis of the pipeline, the characteristic parameters being represented by magnetic field induction gradients dB that characterize a change in the magnetic flux density passing through the array of sensors when the device for contactless measurement of the mechanical stresses moves along the axis of the pipeline at a distance from the pipeline, wherein the first device for contactless measurement of the magnetic flux density is configured to perform the contactless measurement of the magnetic flux density in an YZ plane, the YZ plane defining an action area of transverse hoop stresses of the pipeline, the second device for contactless measurement of the magnetic flux density is configured to perform the contactless measurement of the magnetic flux density in an XY plane, the XY plane defining an action area of longitudinal horizontal stresses of the pipeline and bending moments, the third device for contactless measurement of the magnetic flux density is configured to perform the contactless measurement of the magnetic flux density in two XZ planes spaced apart from each other, the XZ planes defining an action area of longitudinal vertical stresses and bending moments, wherein the contactless measurements take place simultaneously in the YZ, XY planes and the two XZ planes; the computing device for determining the mechanical stresses, the computing device comprising a memory coupled to a processor, the computing device being configured to receive the data on the mechanical stresses in the pipeline from the device for contactless measurement of the mechanical stresses and transmit control data to the device for contactless measurement of the mechanical stresses via a data reception and transmission channel; wherein the processor is configured to: a) receive, from the device for contactless measurement of the mechanical stresses in the pipeline, the characteristic parameters as the magnetic field induction gradients dB which characterize the change in the magnetic flux density, b) calibrate the characteristic parameters based on the data received from the device for contactless measurement of the mechanical stress, said calibration comprising determining calibration coefficients according to the known data, the calibration coefficients characterizing a magnetomechanical state of the homogeneous pipeline throughout the pipeline as a dependence of the change in the magnetic flux density on a change in a mechanical moment, the calibration coefficients being determined as ratios of magnetic and mechanical moments, said calibration being based on conditions of previously known differences in the magnetic moments in two different cross-sections of the pipeline or known differences in the mechanical moments under conditions of a difference in an internal pressure or temperature; c) calculate the distribution of mechanical stresses at each measure point throughout the pipeline by means of matrix transformations, wherein increments of a main stress vector at each measure point are determined based on the matrix transformations, wherein the transverse hoop, longitudinal horizontal and longitudinal vertical stresses are calculated separately as projections of the main stress vector on the corresponding planes lying in the action area of the stresses; and d) determine the mechanical stresses in the pipeline based on the calculated distribution of mechanical stresses at each measure point throughout the pipeline, wherein anomalies are determined at given criteria for limit values of the stresses, wherein a maximum deviation from permissible values of the mechanical stresses is used to determine a concentration value of the mechanical stresses, and the shape of the distribution of mechanical stresses is used to determine a type of an anomaly source; wherein the memory comprises a database of mechanical stresses in the pipeline, the memory is configured to receive, from the processor, and store the characteristic parameters as the magnetic field induction gradients dB, the determined calibration coefficients and the calculated distributions of the mechanical stresses at each measure point throughout the pipeline.

Additionally, the contactless determination of the mechanical stresses in the pipeline is performed over the pipeline located in at least one of the following locations: a mountainous area, a wetland, an area with ground movements and landslide effects, an area with increased seismic activity, a water environment with possible sagging.

Additionally, at least one array of sensors is made according to a differential connection scheme.

Additionally, the YZ, XY planes and the two XZ planes are located in a coordinate system spatially fixed to the pipeline.

Additionally, the device for contactless measurement of the mechanical stresses in the pipeline is configured as a frame made of non-magnetic materials, the frame being configured to change an aperture of each device for contactless measurement of the magnetic flux density depending on a diameter of the pipeline and a distance to the axis of the pipeline and subsequently transform the coordinate system into a cylindrical coordinate system fixed to the axis of the pipeline.

Additionally, the array of sensors of at least one device for contactless measurement of the magnetic flux density is configured as an array of fluxgate sensors configured to adjust a frequency of an excitation current, perform the contactless measurement of the magnetic flux density of a resonant nature, and subsequently determine a type of inhomogeneity or feature of the pipeline (a defect) as a result of a correlation of such an inhomogeneity or feature with a natural frequency.

Additionally, the device for contactless measurement of the mechanical stresses in the pipeline comprises a system of monitoring sensors that includes pressure sensors, a GPS or GLONASS module for providing the possibility of determining the location of the device relative to the axis of the pipeline in horizontal and vertical planes, under water or in air.

Additionally, each of the devices for contactless measurement of the magnetic flux density is configured to change positions along a circumference of a distribution of magnetic flux lines directed from a center of the axis of the pipeline or magnetic flux lines directed towards the center of the axis of the pipeline to convert the measurements into a cylindrical coordinate system.

Additionally, the device for contactless measurement of the mechanical stresses in the pipeline comprises a plurality of gyroscopes and accelerometers configured to determine a current state and an exact position of the device in the coordinate system fixed to the pipeline during measurements under conditions of possible oscillations to provide the possibility of determining a distance from an initial measurement portion to a final measurement portion.

Additionally, the device for contactless measurement of the mechanical stresses in the pipeline comprises a beacon sensor configured as a non-volatile source of electromagnetic radiation to provide the possibility of detecting the contactless measurement device when the beacon sensor is used on a carrier remotely controlled by an operator.

Additionally, the device for contactless measurement of the mechanical stresses in the pipeline and the computing device for determining the mechanical stresses are spatially spaced from each other and connected to each other by wired and/or wireless communication lines.

The technical result is also achieved by a proposed method for contactless determination of mechanical stresses in a pipeline. The method comprises the steps of: performing the contactless measurement of a magnetic flux density using arrays of sensors through a sequential contactless measurement of characteristic parameters along an axis of the pipeline, the characteristic parameters being represented by magnetic field induction gradients dB that characterize a change in the magnetic flux density passing through the arrays of sensors when the arrays of sensors move along the axis of the pipeline at a distance from the pipeline, wherein said performing the measurement of the magnetic flux density comprises: i) performing the contactless measurement of the magnetic flux density in an YZ plane, the YZ plane defining an action area of transverse hoop stresses of the pipeline, ii) performing the contactless measurement of the magnetic flux density in an XY plane, the XY plane defining an action area of longitudinal horizontal stresses of the pipeline and bending moments, iii) performing the contactless measurement of the magnetic flux density in two XZ planes spaced apart from each other, the XZ planes defining an action area of longitudinal vertical stresses and bending moments; wherein the contactless measurements are performed simultaneously in the YZ, XY planes and the two XZ planes; receiving, by a computing device for determining the mechanical stresses, the characteristic parameters as the magnetic field induction gradients dB that characterize the change in the magnetic flux density; calibrating, by the computing device, the characteristic parameters based on the received data, said calibrating comprising determining calibration coefficients according to the known data, the calibration coefficients characterizing a magneto-mechanical state of the homogeneous pipeline throughout the pipeline as a dependence of the change in the magnetic flux density on a change in a mechanical moment, the calibration coefficients being determined as ratios of magnetic and mechanical moments, said calibrating being based on conditions of previously known differences in the magnetic moments in two different cross-sections of the pipeline or known differences in the mechanical moments under conditions of a difference in an internal pressure or temperature; calculating, by the computing device, a distribution of mechanical stresses at each measure point throughout the pipeline by means of matrix transformations, wherein increments of a main stress vector at each measure point are determined based on the matrix transformations, wherein the transverse hoop, longitudinal horizontal and longitudinal vertical stresses are calculated separately as projections of the main stress vector on the corresponding planes lying in the action area of the stresses; and determining, by the computing device, the mechanical stresses in the pipeline based on the calculated distribution of mechanical stresses at each measure point throughout the pipeline, wherein anomalies are determined at given criteria for limit values of the stresses, wherein a maximum deviation from permissible values of the mechanical stresses is used to determine a concentration value of the mechanical stresses, and the shape of the distribution of mechanical stresses is used to determine a type of an anomaly source; storing, in a database of mechanical stresses, the characteristic parameters as the magnetic field induction gradients dB, the determined calibration coefficients and the calculated distributions of mechanical stresses at each measure point throughout the pipeline.

Additionally, the contactless determination of the mechanical stresses in the pipeline is performed over the pipeline located in at least one of the following locations: a mountainous area, a wetland, an area with ground movements and landslide effects, an area with increased seismic activity, a water environment with possible sagging.

Additionally, the YZ, XY planes and the two XZ planes are located in a coordinate system spatially fixed to the pipeline.

Additionally, the method comprises the step of determining a location of the array of sensors relative to the axis of the pipeline in horizontal and vertical planes, under water or in air by means of pressure sensors and/or a GPS/GLONASS module.

Additionally, the method comprises the step of changing positions of the arrays of sensors along a circumference of a distribution of magnetic flux lines directed from a center of the axis of the pipeline or magnetic flux lines directed towards the center of the axis of the pipeline to convert the measurements into a cylindrical coordinate system.

Additionally, the method comprises the step of determining, by means of a plurality of gyroscopes and accelerometers, a current state and an exact position of the arrays of sensors in the coordinate system fixed to the pipeline during measurements under conditions of possible oscillations to provide the possibility of determining a distance from an initial measurement portion to a final measurement portion.

It should be obvious that both the previous summary and the following detailed description are given by way of example and explanation only, and are not limitations of the present invention.

DETAILED DESCRIPTION OF THE INVENTION

Figure 1:
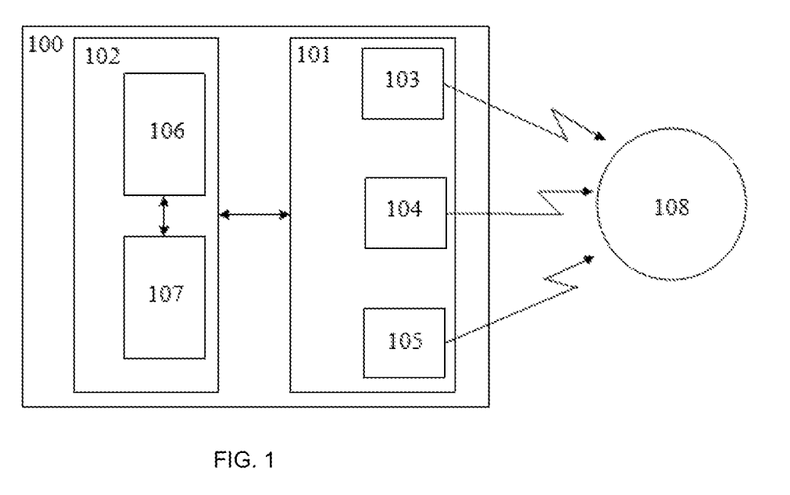
FIG. 1 shows a block diagram of a system for contactless determination of mechanical stresses in a pipeline.

FIG. 1 schematically shows a system 100 for contactless determination of mechanical stresses in a pipeline 108. The system 100 comprises a device 101 for contactless measurement of the mechanical stresses in the pipeline 108 and a computing device 102 for determining the mechanical stresses. The device 101 includes a first device 103 for contactless measurement of a magnetic flux density, a second device 104 for contactless measurement of the magnetic flux density, and a third device 105 for contactless measurement of the magnetic flux density. The computing device 102 comprises a processor 106 and a memory 107. The processor 106 is coupled to the memory 107 via a data reception and transmission bus (not shown in the figure). The computing device 102 is connected to the contactless measurement device 103 via a data reception and transmission channel. It should be noted that, in an alternative embodiment of the present invention, the computing device 102 and the device 103 may be spatially spaced apart from each other and interconnected by wired and/or wireless communication lines. For example, as the communication lines, SPI, Bluetooth, Wifi, GPRS/LTE communication lines, or acoustic electromagnetic subsea communication systems may be used. The devices 103, 104 and 105 for contactless measurement of the magnetic flux density are included in the device 103 for contactless measurement of the magnetic flux density and transmit measurement data to the processor 106 which is part of the computing device 102. In the context of the present invention, the measurement refers to sequential scanning when the device 101 moves along the axis of the pipeline at a distance from the pipeline.

It should be noted that, according to the present invention, the operations of calibrating characteristic parameters, calculating a distribution of mechanical stresses at each measure point throughout the pipeline 108 by means of matrix transformations, and determining the mechanical stresses in the pipeline 108 based on the calculated distribution of mechanical stresses at each measure point throughout the pipeline 108 are performed by the processor 106. In the context of the present invention, a mechanical stress is a vector quantity. The degree of correlation between the directions of action of external forces and internal stresses around a defect will be the most significant factor for assessing the safety of the pipeline 108.

As mentioned above, the device 101 for contactless measurement of the mechanical stresses in the pipeline 108 comprises at least three devices 103, 104, 105 for contactless measurement of the magnetic flux density and is configured to move along the axis of the pipeline 108 at a distance from the pipeline 108, and subsequently transmit data on the mechanical stresses in the pipeline to the computing device 102. These data comprise information on the shape of the distribution of mechanical stresses. It should be noted that the shape of the distribution of mechanical stresses may be different. For example, stresses directed along and across the axis of the pipeline may have different hazards, while a magnetic-field amplitude level and, accordingly, the deviation of the increment of the magnitude of the Earth's magnetic field vector from mean background values can be the same. However, the danger of the pipeline in the region of each such crack will be different. At the same internal pressure, the longitudinal position of a defect significantly increases the hoop stresses compared to a transverse defect. Alternatively, the device 101 for contactless measurement of the mechanical stresses in the pipeline may be configured as a frame made of non-magnetic materials, which is configured to change the apertures (sensor bases) of each device for contactless measurement of the magnetic flux density depending on the diameter of the pipeline 108 and the distance to its axis and subsequently transform the coordinate system into a cylindrical coordinate system fixed to the axis of the pipeline. Also, as an alternative, the device 101 for contactless measurement of the mechanical stresses in the pipeline may further comprise a system of monitoring sensors, which includes pressure sensors (not shown in the figure), a GPS or GLONASS module (not shown in the figure), to provide the possibility of determining the location of the device relative to the axis of the pipeline 108 in horizontal and vertical planes, under water or in air. Alternatively, the device 101 for contactless measurement of the mechanical stresses in the pipeline 108 may further comprise a plurality of gyroscopes and accelerometers (not shown in the figure) configured to determine the current state and exact position of the device in the coordinate system fixed to the pipeline 108 during measurements under conditions of possible oscillations to ensure the possibility of determining the distance from an initial measurement portion to a final measurement portion. Alternatively, the device 101 for contactless measurement of the mechanical stresses in the pipeline may further comprise a beacon sensor (not shown in the figure) configured as a non-volatile source of electromagnetic radiation to enable the detection of the contactless measurement device when the beacon sensor is used on a carrier remotely controlled by an operator.

Each of the above-mentioned devices 103, 104 and 105 includes an array of sensors (not shown in the figure) configured to measure the magnetic flux density by performing the sequential contactless measurement of the characteristic parameters along the axis of the pipeline 108. As the characteristic parameters, magnetic field induction gradients dB are used, which characterize a change in the magnetic flux density passing through the array of sensors when the device 101 for contactless measurement of the mechanical stresses moves along the axis of the pipeline 108 at a distance from the pipeline 108. Alternatively, at least one array of sensors may be made according to a differential connection scheme. Also, as an alternative, the array of sensors of at least one device for contactless measurement of the magnetic flux density may be configured as an array of fluxgate sensors configured to adjust a frequency of an excitation current, perform the contactless measurement of the magnetic flux density of a resonant nature, and subsequently determine a type of inhomogeneity or feature of the pipeline 108 (a defect) as a result of the correlation of such an inhomogeneity or feature with a natural frequency. Alternatively, each of the devices for contactless measurement of the magnetic flux density may be configured to change positions along the circumference of the distribution of magnetic flux lines directed from the center of the pipeline axis or magnetic flux lines directed towards the center of the pipeline axis to convert the measurements into a cylindrical coordinate system.

Figure 2:
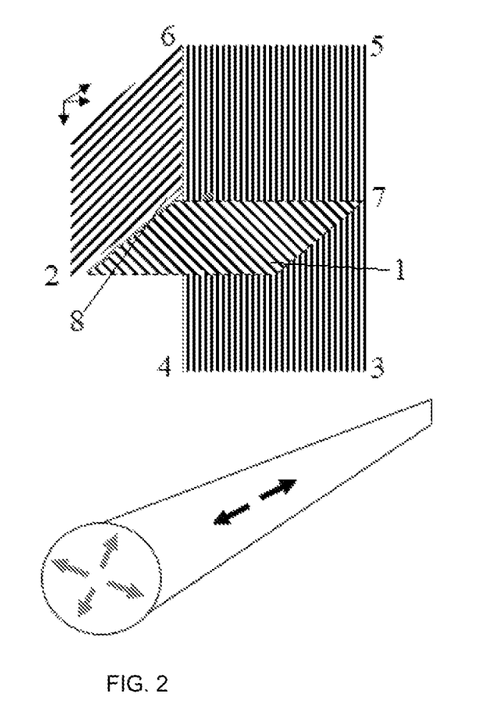
FIG. 2 schematically shows an arrangement of YZ, XY planes and two XZ planes.

The first device 103 for contactless measurement of the magnetic flux density is configured to perform the contactless measurement of the magnetic flux density in an YZ plane (see FIG. 2, the plane bounded by points 1-2-3-4-5-6). The YZ plane defines an action area of transverse hoop stresses of the pipeline. The second device 104 for contactless measurement of the magnetic flux density is configured to perform the contactless measurement of the magnetic flux density in an XY plane (see FIG. 2, the plane bounded by points 1-2-7-8). The XY plane defines an action area of longitudinal horizontal stresses of the pipeline and bending moments. The third device 105 for contactless measurement of the magnetic flux density is configured to perform the contactless measurement of the magnetic flux density in two XZ planes spaced apart from each other (see FIG. 2, the planes bounded by points 3-5-7 and 4-6-8). The XZ planes define an action area of longitudinal vertical stresses and bending moments. In the context of the present invention, the contactless measurements take place simultaneously in the YZ, XY and the two XZ planes. In other words, for the contactless measurements in the planes YZ, XY and the two planes XZ, the present invention does not require a change in the orientation (movement and rotation in space) of the device for contactless measurement of the mechanical stresses in the pipeline 108. Alternatively, the planes YZ, XY and the two planes XZ may be in a coordinate system spatially fixed to the pipeline 108.

The computing device 102 for determining the mechanical stresses comprises the memory 107 coupled to the processor and configured to receive the data on the mechanical stresses in the pipeline 108 from the contactless measurement device 101 and transmit control data to the contactless measurement device 101 through the data reception and transmission channel. The processor 106 is configured to perform the following operations of: receiving, from the device 101 for contactless measurement of the mechanical stresses in the pipeline 108, the characteristic parameters as the magnetic field induction gradients dB which characterize the change in the magnetic flux density; calibrating the characteristic parameters based on the data received from the contactless measurement device, said calibration comprising determining calibration coefficients according to the known data, the calibration coefficients characterizing the magnetomechanical state of the homogeneous pipeline 108 throughout the pipeline as a dependence of a change in the magnetic flux density on a change in the mechanical moment; calculating the distribution of mechanical stresses at each measure point throughout the pipeline 108 by means of the matrix transformations, wherein increments of a main stress vector at each measure point are determined based on the matrix transformations; and determining the mechanical stresses in the pipeline 108 based on the calculated distribution of mechanical stresses at each measure point throughout the pipeline 108, wherein anomalies are determined at given criteria for limit values of the stresses.

The calibration coefficients are determined as the ratios of magnetic and mechanical moments. Said calibration is determined either from conditions of previously known differences in magnetic moments in two different cross-sections of the pipeline 108 or known differences in mechanical moments under conditions of a difference in an internal pressure or temperature. The transverse hoop, longitudinal horizontal and longitudinal vertical stresses are calculated separately as projections of the main stress vector on the corresponding planes lying in the action area of the stresses. The concentration value of the mechanical stresses is determined based on the maximum deviation from the permissible values of the mechanical stresses, while the type of the anomaly source is determined based on the shape of the distribution of mechanical stresses (e.g., the longitudinal location of a defect, the transverse location of the defect, the longitudinal transverse location of the defect, etc.).

The memory 107 comprises a database (not shown in the figure) of mechanical stresses in the pipeline 108, and is configured to receive, from the processor 106, the characteristic parameters as the magnetic field induction gradients dB, the determined calibration coefficients and the calculated distributions of mechanical stresses at each measure point throughout the pipeline 108 and store the same.

The present invention may perform the contactless determination of the mechanical stresses in the pipeline 108 over the pipeline located in at least one of the following locations: a mountainous area, a wetland, an area with ground movements and landslide effects, an area with increased seismic activity, a water environment with possible sagging.

Figure 3:
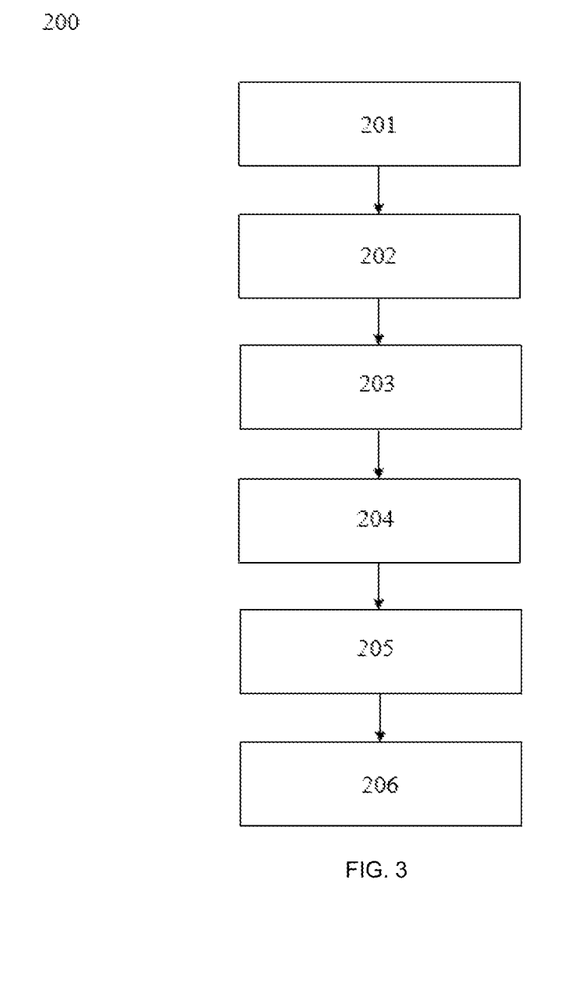
FIG. 3 shows a flowchart of a method for contactless determination of mechanical stresses in a pipeline.

The steps of a method 200 for contactless determination of mechanical stresses in the pipeline will be now described as an implementation example in accordance with FIG. 3.

In a first step 201, the magnetic flux density is measured in contactless manner by using the arrays of sensors, i.e., by performing the sequential contactless measurement of the characteristic parameters along the axis of the pipeline. As the characteristic parameters, the magnetic field induction gradients dB are used, which characterize a change in the magnetic flux density passing through the arrays of sensors during their movement along the axis of the pipeline 108 at a distance from the pipeline 108. The contactless measurement of the magnetic flux density includes the contactless measurement of the magnetic flux density in the YZ plane, the contactless measurement of the magnetic flux density in the XY plane, and the contactless measurement of the magnetic flux density in the two XZ planes spaced apart from each other. The YZ plane defines the action area of the transverse hoop stresses of the pipeline, the XY plane defines the action area of the longitudinal horizontal stresses of the pipeline and the bending moments, and the planes XZ define the action area of the longitudinal vertical stresses and the bending moments. The above-mentioned contactless measurements take place simultaneously in the YZ, XY planes and the two XZ planes. After the contactless measurements of the magnetic flux density, the method proceeds to a step 202.

In the step 202, the computing device 102 receives the characteristic parameters as the magnetic flux density gradients dB which characterizes the change in the magnetic flux density. After said data are received, the method proceeds to a step 203.

In the step 203, the computing device 102 calibrates the characteristic parameters based on the received data. During the calibration, the known data are used to determine the calibration coefficients characterizing the magnetomechanical state of the homogeneous pipeline throughout the pipeline as a dependence of the change in the magnetic flux density on the change in the mechanical moment. The calibration coefficients are determined as the ratios of the magnetic and mechanical moments. The calibration is determined from the conditions of the previously known differences in the magnetic moments in two different cross-sections of the pipeline or the known differences in the mechanical moments under the conditions of a difference in the internal pressure or temperature. After said calibration, the method proceeds to a step 204.

In the step 204, the computing device 102 calculates the distributions of mechanical stresses at each measure point throughout the pipeline 108 by means of the matrix transformations. As a result of the matrix transformations, the increments of the main stress vector at each measure point are determined. The transverse hoop, longitudinal horizontal and longitudinal vertical stresses are calculated separately as projections of the main stress vector on the corresponding planes lying in the action area of stress. After this calculation, the method proceeds to a step 205.

In the step 205, the computing device 102 determines the mechanical stresses in the pipeline 108 based on the calculated distribution of mechanical stresses at each measure point throughout the pipeline. Anomalies are determined at given criteria for the limit values of the stresses. The concentration value of the mechanical stresses is determined based on the maximum deviation from the permissible values of the mechanical stresses, and the type of the anomaly source is determined based on the shape of the distribution of mechanical stresses. After this determination, the method proceeds to a step 206.

In the step 206, the characteristic parameters as the magnetic field induction gradients dB, the determined calibration coefficients, and the calculated distributions of mechanical stresses at each measure point throughout the pipeline 108 are automatically stored in the database of mechanical stresses.

Various implementation examples of the present invention are given below.

Example 1. To determine the calibration coefficients in the annular components of a magnetic flux, two control cross-sections of the pipeline with different magnetic signal levels are selected and assigned. Magnetic moments M1, M2 and mechanical moments S1, S2 are determined by contact methods in each of the two selected cross-sections, as a result of integrating the corresponding parameters over the cross-section. The magnetic moment M is determined based on an initially selected difference in the intensity of magnetic fluxes, and the mechanical moment S is determined by the difference in the gradients of tensile and compressive stresses in each of the two selected cross-sections. The above-mentioned moments may be obtained by using conventional methods, for example, by means of a coercive force and a finite element method. Under conditions of the difference in the magnetic moments in both cross-sections dM=M2−M1, the increment of the mechanical moment dS=S2−S1 in these cross-sections is determined.

Calibration coefficients K, which characterize the magnetomechanical state of the homogeneous pipeline in the action area of the hoop, longitudinal stresses and other types of stresses, are calculated as the ratio of the increments dS of the gradient of the mechanical moments between the two cross-sections to the magnitude of the increment in the magnetic moment dM in the same cross-sections (K=dS/dM).

Example 2. There are conditions under which the opening of the pipeline (probing), even at one/two points requiring direct contact with the surface of the pipeline, is impossible or difficult (offshore pipelines, pipelines inside factory territories, pumping and compressor stations, etc.). In this case, it is possible to apply a calibration method, in which the corresponding calibration coefficients may be determined from the conditions of the difference in epy mechanical moments. For this purpose, the intensity of the magnetic flux is scanned twice in a limited portion of the pipeline under different load conditions. For example, a change in the pressure inside the pipeline (not necessarily its increase) or temperature creates different load conditions with a corresponding mechanical moment dS, while the difference in the intensity of the magnetic flux dM is held fixed. Further, as in Example 1, the calibration coefficients characterizing the magnetomechanical state of the homogeneous pipeline are calculated as the ratio of the increments dS of the gradient of the mechanical moment to the magnitude of the increment in the magnetic moment dM (K=dS/dM).

Then, the final data processing is performed, which consists in obtaining the distribution of mechanical stresses (hoop, longitudinal and others) along the axis of the entire pipeline. The final data processing is the result of applying the calibration coefficients K to the original distribution of magnetic flux intensities B: S=K*B. Thus, the task of determining the mechanical stresses (hoop, longitudinal, others) in the region of the homogeneous metal pipeline can be solved.

While the invention has been shown and described with reference to certain embodiments thereof, it will be apparent to those skilled in the art that various changes and modifications may be made in the invention, without departing from the actual scope of the invention.

What is claimed is:

1. A system for contactless determination of mechanical stresses in a pipeline, comprising:
a device for contactless measurement of the mechanical stresses in the pipeline, comprising at least three devices for contactless measurement of a magnetic flux density and configured to move along an axis of the pipeline at a distance from the pipeline and subsequently transmit data on the mechanical stresses in the pipeline to a computing device, the data comprising information on a shape of a distribution of mechanical stresses;
wherein each of the at least three devices for contactless measurement of the magnetic flux density comprises an array of sensors configured to measure the magnetic flux density by performing a sequential contactless measurement of characteristic parameters along the axis of the pipeline, the characteristic parameters being represented by magnetic field induction gradients dB that characterize a change in the magnetic flux density passing through the array of sensors when the device for contactless measurement of the mechanical stresses moves along the axis of the pipeline at a distance from the pipeline;
wherein the first device for contactless measurement of the magnetic flux density is configured to perform the contactless measurement of the magnetic flux density in an YZ plane, the YZ plane defining an action area of transverse hoop stresses of the pipeline;
wherein the second device for contactless measurement of the magnetic flux density is configured to perform the contactless measurement of the magnetic flux density in an XY plane, the XY plane defining an action area of longitudinal horizontal stresses of the pipeline and bending moments;
wherein the third device for contactless measurement of the magnetic flux density is configured to perform the contactless measurement of the magnetic flux density in two XZ planes spaced apart from each other, the XZ planes defining an action area of longitudinal vertical stresses and bending moments,
wherein the contactless measurements take place simultaneously in the YZ, XY planes and the two XZ planes;
the computing device for determining the mechanical stresses, the computing device comprising a memory coupled to a processor, the computing device being configured to receive the data on the mechanical stresses in the pipeline from the device for contactless measurement of the mechanical stresses and transmit control data to the device for contactless measurement of the mechanical stresses via a data reception and transmission channel; wherein the processor is configured to:
a) receive, from the device for contactless measurement of the mechanical stresses in the pipeline, the characteristic parameters as the magnetic field induction gradients dB which characterize the change in the magnetic flux density;
b) calibrate the characteristic parameters based on the received data from the device for contactless measurement of the mechanical stresses, said calibration comprising determining calibration coefficients according to a known data, the calibration coefficients characterizing a magnetomechanical state of a homogeneous pipeline throughout the pipeline as a dependence of the change in the magnetic flux density on a change in a mechanical moment, the calibration coefficients being determined as ratios of magnetic and mechanical moments, said calibration being based on conditions of previously known differences in magnetic moments in two different cross-sections of the pipeline or known differences in the mechanical moments under conditions of a difference in an internal pressure or temperature;
c) calculate a distribution of mechanical stresses at each measure point throughout the pipeline by means of matrix transformations, wherein increments of a main stress vector at each measure point are determined based on the matrix transformations, wherein the transverse hoop, longitudinal horizontal and longitudinal vertical stresses are calculated separately as projections of the main stress vector on the corresponding planes lying in the action area of the stresses; and
d) determine the mechanical stresses in the pipeline based on the calculated distribution of mechanical stresses at each measure point throughout the pipeline, wherein anomalies are determined at given criteria for limit values of the mechanical stresses, wherein a maximum deviation from permissible values of the mechanical stresses is used to determine a concentration value of the mechanical stresses, and the shape of the distribution of mechanical stresses is used to determine a type of an anomaly source;
wherein the memory comprises a database of mechanical stresses in the pipeline and configured to receive, from the processor, and store the characteristic parameters as the magnetic field induction gradients dB, the determined calibration coefficients and the calculated distributions of mechanical stresses at each measure point throughout the pipeline.

2. The system of claim 1, wherein the contactless determination of the mechanical stresses in the pipeline is performed over the pipeline located in at least one of the following locations: a mountainous area, a wetland, an area with ground movements and landslide effects, an area with increased seismic activity, a water environment with possible sagging.

3. The system of claim 1, wherein at least one array of sensors is made according to a differential connection scheme.

4. The system of claim 1, wherein the YZ, XY planes and the two XZ planes are located in a coordinate system spatially fixed to the pipeline.

5. The system of claim 1, wherein the device for contactless measurement of the mechanical stresses in the pipeline is configured as a frame made of non-magnetic materials, the frame being configured to change an aperture of each device for contactless measurement of the magnetic flux density depending on a diameter of the pipeline and a distance to the axis of the pipeline with subsequent transformation of the coordinate system into a cylindrical coordinate system fixed to the axis of the pipeline.

6. The system of claim 1, wherein the array of sensors of at least one device for contactless measurement of the magnetic flux density is configured as an array of fluxgate sensors configured to adjust a frequency of an excitation current, perform the contactless measurement of the magnetic flux density of a resonant nature, and subsequently determine a type of inhomogeneity or feature of the pipeline (a defect) as a result of a correlation of the inhomogeneity or feature with a natural frequency.

7. The system of claim 1, wherein the device for contactless measurement of the mechanical stresses in the pipeline further comprises a system of monitoring sensors that comprises pressure sensors, a Global Positioning System (GPS) or Global Navigation Satellite System (GLONASS) module for providing the possibility of determining a location of the device relative to the axis of the pipeline in horizontal and vertical planes, under water or in air.

8. The system of claim 1, wherein each of the devices for contactless measurement of the magnetic flux density is configured to change positions along a circumference of a distribution of magnetic flux lines directed from a center of the axis of the pipeline or magnetic flux lines directed towards the center of the axis of the pipeline to convert each of the measurements into a cylindrical coordinate system.

9. The system of claim 1, wherein the device for contactless measurement of the mechanical stresses in the pipeline further comprises a plurality of gyroscopes and accelerometers configured to determine a current state and an exact position of the device for contactless measurement of the mechanical stresses in the coordinate system fixed to the pipeline during measurements under conditions of possible oscillations to provide a possibility of determining of a distance from an initial measurement portion to a final measurement portion.

10. The system of claim 1, wherein the device for contactless measurement of the mechanical stresses in the pipeline further comprises a beacon sensor configured as a non-volatile source of electromagnetic radiation to provide the possibility of detecting the device for contactless measurement of the mechanical stresses when the beacon sensor is used on a carrier remotely controlled by an operator.

11. The system of claim 1, wherein the device for contactless measurement of the mechanical stresses in the pipeline and the computing device for determining the mechanical stresses are spatially spaced from each other and connected to each other by wired and/or wireless communication lines.

12. A method for contactless determination of mechanical stresses in a pipeline, comprising:
performing a contactless measurement of a magnetic flux density using arrays of sensors through a sequential contactless measurement of characteristic parameters along an axis of the pipeline, the characteristic parameters being represented by magnetic field induction gradients dB that characterize a change in the magnetic flux density passing through the arrays of sensors when the arrays of sensors move along the axis of the pipeline at a distance from the pipeline, wherein said performing the measurement of the magnetic flux density comprises:
i) performing the contactless measurement of the magnetic flux density in an YZ plane, the YZ plane defining an action area of transverse hoop stresses of the pipeline,
ii) performing the contactless measurement of the magnetic flux density in an XY plane, the XY plane defining an action area of longitudinal horizontal stresses of the pipeline and bending moments,
iii) performing the contactless measurement of the magnetic flux density in two XZ planes spaced apart from each other, the XZ planes defining an action area of longitudinal vertical stresses and bending moments;
wherein the contactless measurements are performed simultaneously in the YZ, XY planes and the two XZ planes;

receiving, by a computing device for determining the mechanical stresses, the characteristic parameters as the magnetic field induction gradients dB that characterize the change in the magnetic flux density;
calibrating, by the computing device, the characteristic parameters based on the received data, said calibrating comprising determining calibration coefficients according to a known data, the calibration coefficients characterizing a magnetomechanical state of a homogeneous pipeline throughout the pipeline as a dependence of the change in the magnetic flux density on a change in a mechanical moment, the calibration coefficients being determined as ratios of magnetic and mechanical moments, said calibrating being based on conditions of previously known differences in magnetic moments in two different cross-sections of the pipeline or known differences in mechanical moments under conditions of a difference in an internal pressure or temperature;
calculating, by the computing device, distributions of mechanical stresses at each measure point throughout the pipeline by means of matrix transformations, wherein increments of a main stress vector at each measure point are determined based on the matrix transformations, wherein the transverse hoop, longitudinal horizontal and longitudinal vertical stresses are calculated separately as projections of the main stress vector on the corresponding planes lying in the action area of the stresses;
determining, by the computing device, the mechanical stresses in the pipeline based on the calculated distribution of mechanical stresses at each measure point throughout the pipeline, wherein anomalies are determined at given criteria for limit values of the stresses, wherein a maximum deviation from permissible values of the mechanical stresses is used to determine a concentration value of the mechanical stresses, and a shape of the distribution of mechanical stresses is used to determine a type of an anomaly source; and storing storing, in a database of mechanical stresses, the characteristic parameters as the magnetic field induction gradients dB, the determined calibration coefficients and the calculated distributions of mechanical stresses at each measure point throughout the pipeline.

13. The method of claim 12, wherein the contactless determination of the mechanical stresses in the pipeline is performed over the pipeline located in at least one of the following locations: a mountainous area, a wetland, an area with ground movements and landslide effects, an area with increased seismic activity, a water environment with possible sagging.

14. The method of claim 12, wherein the YZ, XY planes and the two XZ planes are located in a coordinate system spatially fixed to the pipeline.

15. The method of claim 12, further comprising determining a location of the array of sensors relative to the axis of the pipeline in horizontal and vertical planes, under water or in air by means of pressure sensors and a GPS/GLONASS module.

16. The method of claim 12, further comprising changing positions of the array of sensors along a circumference of a distribution of magnetic flux lines directed from a center of the axis of the pipeline or magnetic flux lines directed towards the center of the axis of the pipeline to convert each of the measurements into a cylindrical coordinate system.

17. The method of claim 12, further comprising determining, by means of a plurality of gyroscopes and accelerometers, a current state and an exact position of the array of sensors in the coordinate system fixed to the pipeline during measurements under conditions of possible oscillations to provide a possibility of determining a distance from an initial measurement portion to a final measurement portion.

\* \* \* \* \*